United States Patent [19]
Higuchi et al.

[11] Patent Number: 5,784,036
[45] Date of Patent: Jul. 21, 1998

[54] HEAD-UP DISPLAY DEVICE HAVING SELECTIVE DISPLAY FUNCTION FOR ENHANCED DRIVER RECOGNITION

[75] Inventors: Masahiro Higuchi, Chiryu; Naohito Kanamori, Yokkaichi, both of Japan

[73] Assignee: Nippondenso Co., Ltd., Kariya, Japan

[21] Appl. No.: 642,762

[22] Filed: May 6, 1996

[30] Foreign Application Priority Data

May 26, 1995 [JP] Japan ................................. 7-128346

[51] Int. Cl.⁶ .............................................. G09G 5/00
[52] U.S. Cl. ................................... 345/7; 345/173
[58] Field of Search ............................ 345/7, 8, 9, 127, 345/130, 32, 173, 175, 147, 150; 359/13, 14, 630

[56] References Cited

U.S. PATENT DOCUMENTS

| | | |
|---|---|---|
| 4,763,356 | 8/1988 | Day, Jr. et al. |
| 4,818,048 | 4/1989 | Moss ............................ 345/7 |
| 5,400,045 | 3/1995 | Aoki ............................ 345/7 |
| 5,646,639 | 7/1997 | Koie ............................ 345/7 |

FOREIGN PATENT DOCUMENTS

| | | |
|---|---|---|
| 0476972A2 | 3/1992 | European Pat. Off. |
| 2000778 | 9/1969 | France . |
| 4112594A1 | 12/1991 | Germany . |
| 4-293112 | 10/1992 | Japan . |
| 04342619 | 11/1992 | Japan . |
| 4-342619 | 11/1992 | Japan . |
| 2043289 | 10/1980 | United Kingdom . |
| WO 92/08285 | 5/1992 | WIPO . |

*Primary Examiner*—Chanh Nguyen
*Attorney, Agent, or Firm*—Cushman Darby & Cushman IP Group of Pillsbury Madison & Sutro LLP

[57] ABSTRACT

A head-up display device includes a display unit for emitting display light corresponding to images of control switches, and an optical reflector for reflecting display light. A windshield or a combiner installed on the windshield reflects the image before creating a display image in front of the windshield. The head-up display device has touch sensors on control switches mounted inside a vehicle. When these touch sensors detect user contact on a control switch, the display unit displays the touched control switch and related switches together with highlighting the same control switch in comparison with its related switches.

14 Claims, 3 Drawing Sheets

HEAD-UP DISPLAY DEVICE HAVING SELECTIVE DISPLAY FUNCTION FOR ENHANCED DRIVER RECOGNITION

CROSS-REFERENCE TO RELATED APPLICATION

This application is related to and claims priority from Japanese Patent Application No. Hei-7-128346, the contents of which are hereby incorporated by reference.

BACKGROUND OF THE INVENTION

1. Field of the Invention

The present invention relates to a head-up display device for creating an image showing various information and, more particularly, to a head-up display device which creates images of air conditioner control switches, audio system control switches, telephone control switches or the like of a vehicle and displaying such images in front of a windshield of the vehicle.

2. Description of Related Art

One known device for displaying information such as instrument panel meters or the like of a vehicle is a head-up display device which forms images of meters or the like in front of a windshield so that a driver can visually check them, without turning his eyes away from a forward direction of the vehicle, by projecting such images onto the windshield and providing images reflected by the windshield to the driver's eyes.

Meanwhile, various control switches such as air conditioner control switches, audio system control switches, telephone control switches and the like are installed in instrument panels and console boxes of the vehicle. However, such arrangement impedes driving operations of the driver because he had to turn his eyes away downwards from the forward direction of the vehicle, hence, away from the road, for a moment to visually check switch positions when manipulating such control switches during driving.

In this way, proposed conventional head-up display devices disclosed in Japanese Patent Laid-Open Publication No. Hei-4-342619 and the like display images of audio system control switches, telephone switches and the like in front of the windshield so that the driver can manipulate the switches without turning his eyes away from the forward direction of the vehicle.

However, with this type of head-up display device, because control panels of audio system control switches and telephone control switches are displayed in their entirety, the image of each switch will have to be reduced in size and become harder to see. On the other hand, if the display image is to be enlarged, there will be a need for a bigger display unit, a bigger optical system and the like. Such arrangement impairs good forward direction visibility because the image of the control panel will occupy one big portion of the forward field of view when displayed.

SUMMARY OF THE INVENTION

In view of the foregoing problems of the prior art in mind, it is a primary goal of the present invention to provide an improved head-up display device. It is another goal of the present invention to provide a head-up display device which displays very clear images of control switches and switch patterns and which does not require enlargements in the display units, optical systems and the like.

According to one aspect of the present invention, a head-up display device is provided with a display unit for displaying an image of information, such as control switches installed in a vehicle, by emitting display light and an optical reflector for reflecting the display light emitted by the display unit. A touch detection unit is provided for detecting user touch on the control switches and a display control is provided for controlling the display unit to display only images of a control switch and related switches. The display control highlights the image of the control switch using a highlight pattern when the touch detection unit detects user touch on the control switch.

When a driver or passenger touches the control switch, the touch detection unit detects such contact and, when contact is detected, the display control displays only such control switch and related switches and highlights the display of the control switch in comparison with its related switches using the highlight pattern.

Meanwhile, display light emitted by the display unit is reflected by the optical reflector and enters the eyes of the driver and the like after being further reflected by the inner side of a windshield or a combiner. Thus, the driver and the like can see images outside the vehicle of only the switch touched by the driver and related switches in front of the windshield.

Preferably, the head-up display device further includes another display control for highlighting the image of the control switch in relation to its related switches using another highlight pattern when the control switch is actuated after being touched.

Preferably, the highlight pattern involves enlarging the control switch compared with its related switches, reversing the control switch's shade or changing the control switch's color. Also, another highlight pattern, which supplements the highlight pattern, involves any one of enlarging the control switch compared with its related switches, reversing the control switch's shade, or changing the control switch's color.

Accordingly, because only the touched control switch and related switches are displayed, and not the entire plurality of control switches mounted in the air conditioner control panel, audio control panel and the like, the driver or passenger will find switch images easier to see because display images of even the small parts can be enlarged.

In addition, the driver or the like can easily and clearly recognize the switch that has actually been touched because the image of such switch is displayed after enlarging, reverse shading or color changing the same image.

BRIEF DESCRIPTION OF THE DRAWINGS

Additional objects and advantages of the present invention will be more readily apparent from the following detailed description of preferred embodiments thereof when taken together with the accompanying drawings, in which.

DETAILED DESCRIPTION OF PRESENTLY PREFERRED EMBODIMENTS

Preferred embodiments of the present invention are described hereinafter with reference to the accompanying drawings.

Figure 1:
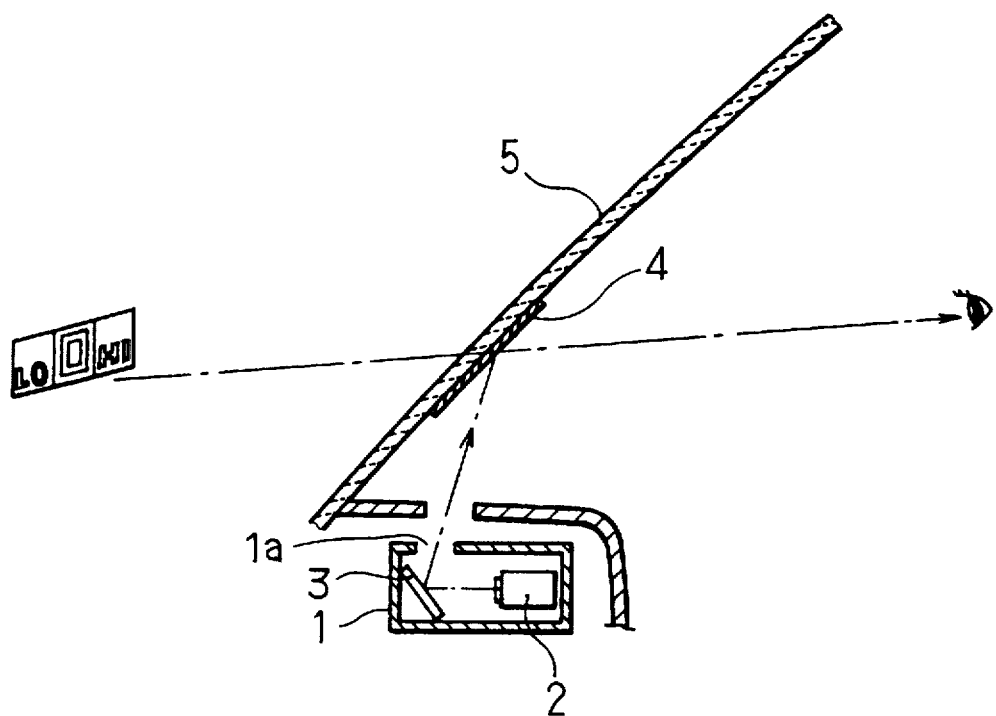
FIG. 1 is a schematic cross-sectional view of a head-up display device according to an embodiment of the present invention.

FIG. 1 shows a schematic block diagram of a head-up display device with its device body 1 installed inside a dashboard of a vehicle. A display unit 2, which includes an LCD (liquid crystal display which has a backlight), an EL (electroluminescence) display unit, a CRT (cathode ray tube), or the like, is installed in the interior of the box-shaped device body 1 and, through driving control executed by a display controller 10 which is described later, the display unit 2 projects light corresponding to vehicle speed images and control switch panel images.

An inclined optical reflector 3 is installed in the device body 1 at a position where it receives light emitted by the display unit 2. An opening 1a, through which light reflected by the optical reflector 3 passes, is formed at an upper part of the device body 1. The device body 1 is positioned in such a way that light reflected by the optical reflector 3 proceeds upward, gets reflected by a combiner 4, which is attached to an inner side of a windshield (transparent glass) 5 located at an upper position (in front of a driver's seat in a vehicle), and is provided to the driver's eyes.

While the combiner 4 in the inner side of the windshield 5 is formed by attaching a deposition film made up of titanium oxide and the like as a semi-transparent reflector film to a glass surface, the combiner 4 may also be formed by forming a reflective surface on the glass surface without attaching the deposition film. In addition, a special glass sheet may be provided above the dashboard in the inner side of the windshield 5 and the combiner 4 may also be formed on such sheet's glass surface. The optical reflector 3 has optical reflective characteristics which allows it to reflect only light that has a prescribed wavelength. A hologram, which records off-axis concave parabolic mirrors or the like, can also be used for the optical reflector 3.

Figure 2:
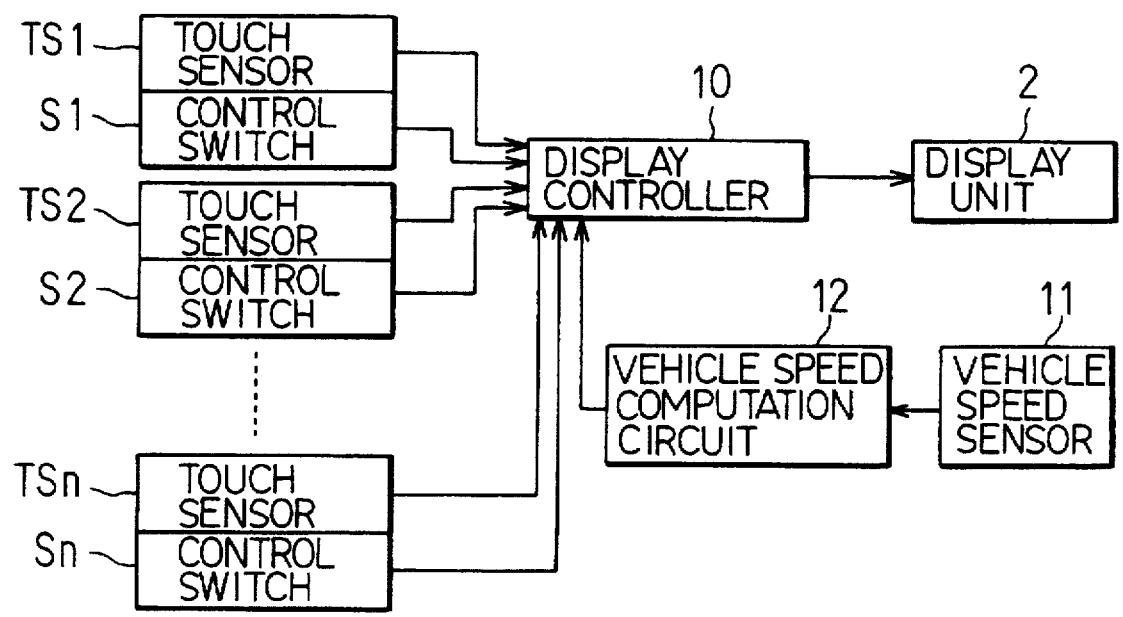
FIG. 2 is a block diagram of a display control system for the head-up display device shown in FIG. 1.

FIG. 2 shows a block diagram of a display control system that includes the display controller 10 which drives and controls the display unit 2. The display controller 10 includes a CPU and the like. As will be described later, the display controller 10 operates to make the display unit 2 display vehicle speed under normal conditions and, when a user touches a control switch of the air conditioner control panel or the like, makes the display unit 2 display only the images of that control switch and related switches. Furthermore, when the same control switch is actuated, the display controller 10 makes the display unit 2 enlarge the display of such control switch and reverse the shade of the same display.

A vehicle speed sensor 11 generates a pulse signal having a frequency proportional to the running speed of the vehicle while a vehicle speed computation circuit 12 computes vehicle speed after counting vehicle speed signals sent by the vehicle speed sensor 11. The computed vehicle speed data is sent to the display controller 10.

Figure 3:
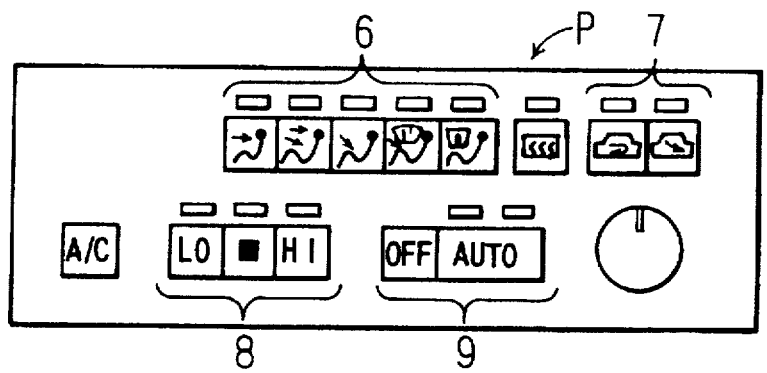
FIG. 3 is a front view of an air conditioner control panel P.

FIG. 3 shows a front view of an air conditioner control panel P which is mounted in an instrument panel or the like of the vehicle. Air outlet selector switches 6, internal/external air selector switches 7, blower switches 8, automatic mode switches 9 and the like are installed in this air conditioner control panel P.

As exemplified in FIG. 2, the air outlet selector switches 6, internal/external air selector switches 7, blower switches 8 and automatic mode switches 9 are each provided with push button-type control switches S1-Sn. Touch sensors TS1-TSn for detecting user touch are provided on these control switches S1-Sn, respectively. Variable resistance-type sensors or the like which use variable capacitance or conductive films can be used for these touch sensors TS1-TSn.

These control switches S1-Sn are connected to an air conditioner controller not shown in the drawings and control switches S1-Sn and touch sensors TS1-TSn are connected to the display controller 10.

The head-up display device is so designed as to normally project light corresponding to the vehicle speed from the display unit 2 as described later. As shown in FIG. 1, the light of the vehicle speed image emitted by the display unit 2 is directed to the optical reflector 3 that is inside the device body 1. Then, light reflected by the optical reflector 3 proceeds upward from the opening 1a, gets reflected by the combiner 4 in the inner side of the windshield 5 and enters the driver's eyes. In this way, the driver's eyes visually observe the vehicle speed image projected by the display unit 2 as an image displayed in front of the windshield 5.

Figure 4:
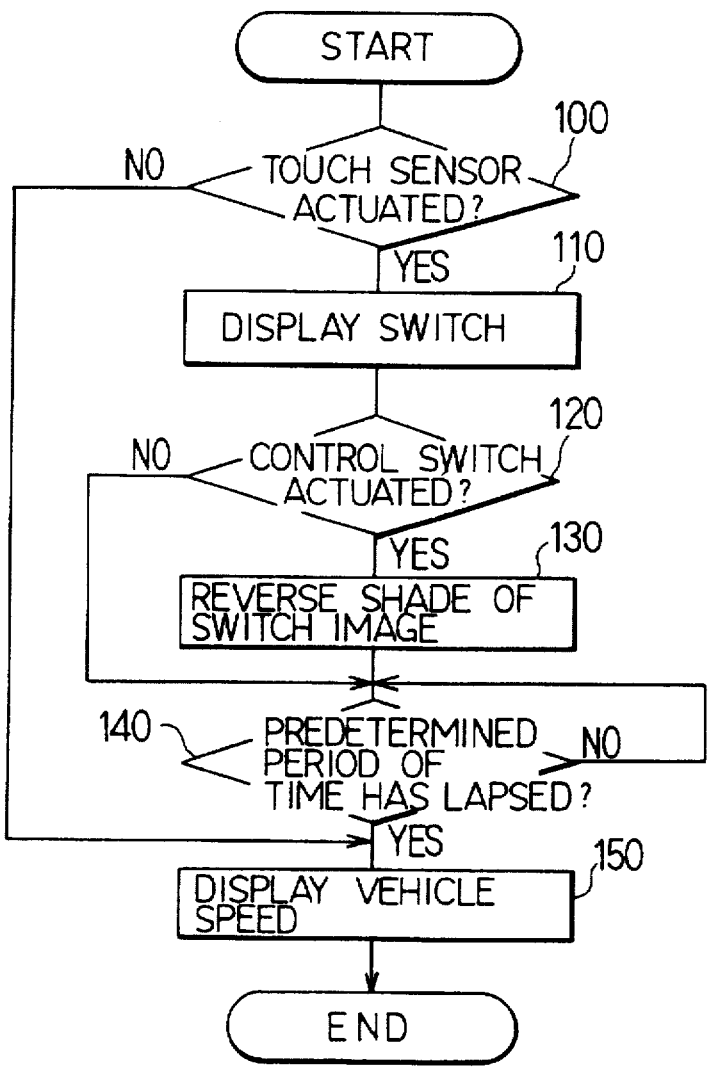
FIG. 4 is a flowchart of display control executed by a display controller shown in FIG. 2.
Figure 5A:
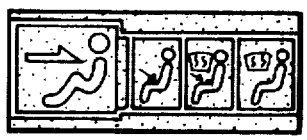
FIGS. 5A–5C are explanatory views showing display images of touched switches.

Under this condition, for example, when the driver touches a left end switch among the air conditioner control switches 6 of FIG. 3 in selecting an air outlet, the touch sensor TS1 on top of such switch detects such contact and sends a contact detection signal to the display controller 10. At this time, the display controller 10 proceeds to perform a programmed control from step 100 of the flowchart of FIG. 4 to step 110, makes the display unit 2 display the image of the air outlet selector switch 6 touched by the driver as shown in FIG. 5A, and enlarges the display of the left end switch that has been actually touched.

Based on this display operation of the display unit 2, because the images of the air outlet selector switches 6 in the air conditioner control panel P are displayed in front of the windshield 5, the switch that has been touched can be easily recognized without having the driver turn his eyes downward and away from the road.

Figure 6A:
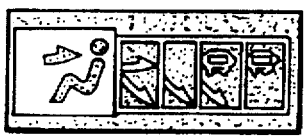
FIGS. 6A–6F are explanatory views showing display images of actuated switches.

At this point, when the driver actuates the control switch S1, which he has touched, at the left end of the air outlet selector switches 6 by pushing the same switch, control proceeds from step 120 to step 130, the display controller 10 reverses the shade of the image of the control switch in the left end of the air outlet selector switches 6 and displays the same switch image as shown in FIG. 6A.

Figure 6B:
Figure 6C:
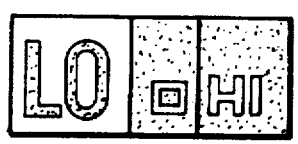
Figure 6D:
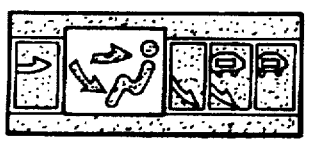

Meanwhile, when the air outlet selector switch 6 actuated is the second switch from the left in FIG. 3, the display controller 10 enlarges the image of only the air outlet selector switch 6 that is second from the left, reverses the shade of the same image and displays it in the display unit 2 as shown in FIG. 6D.

At the same time, due to the actuation of the control switch, the air conditioner controller controls the air outlet, thus allowing, the air outlet to be switched as directed.

Figure 5B:
Figure 6E:

On the other hand, when the driver touches an "AUTO" switch of the automatic mode switches 9, the display controller 10 projects only the image of the automatic mode switches 9 together with enlarging the display of the image of the "AUTO" switch as shown in FIG. 5B. When the driver presses the "AUTO" control switch, the shades of the image of "AUTO" are displayed in reverse as shown in FIG. 6B. Moreover, when an "OFF" control switch is pressed, the image of the "OFF" switch is enlarged and displayed with its shades reversed as shown in FIG. 6E.

Figure 5C:
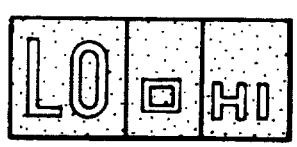
Figure 6F:
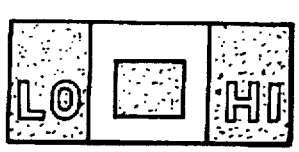

In the same way, when the driver touches a "LO" switch in the blower switches 8, the display controller 10 shows only the images of the blower switches 8 together with an enlarged image of the "LO" switch as shown in FIG. 5C. Then, when the driver presses the control switch of "LO", the display controller 10 displays the image of the "LO" switch with its shades reversed as shown in FIG. 6C. Moreover, when the control switch of "□" is pressed, as shown in FIG. 6F, the image of the "□" switch is enlarged and its shade reversed before the same is displayed by the display unit 2.

In this way, as shown in FIGS. 6A–6F, because only the display of the image of the control switch that has been actuated (pressed) is enlarged and reverse shaded, the driver can recognize very easily the selected switch.

Also, after a predetermined period of time (for example, a few seconds) has lapsed, control goes to step 150 and the display controller 10 operates to switch the display of the display unit 2 again to the vehicle speed image.

Figure 7A:
FIGS. 7A-7C are explanatory views showing display images of touched switches according to another embodiment of the present invention.
Figure 7B:
Figure 7C:

It must be noted here that while only the switch in question and related switches are displayed when a certain control switch is pressed and an enlarged image of the actually pressed switch is displayed in the embodiment described above, it may also be that the touched switch is displayed with its shades reversed and then its enlarged image displayed thereafter when the same switch is pressed. Also, as shown in FIGS. 7A–7C, when a control switch is touched, the related switches may be displayed without any enlargements or reverse shading with the display of the image of the touched switch being enlarged or reverse shaded thereafter when it is pressed.

Furthermore, reverse shading may also be performed by reversing brightness. Also, a colored image may be displayed while varying its color and tint.

Furthermore, while explanations have been made in the above-described embodiment with the air conditioner control panel P as an example, the head-up display device can also be applied to audio system control panels, telephone control panels, navigation system control panels and the like.

Although the present invention has been described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A head-up display device for creating a display image in front of a vehicle's windshield by reflecting an image at an inner side of the windshield, said head-up display device comprising:

a display unit for emitting display light corresponding to images representing control switches installed in a vehicle;

an optical reflector for reflecting said display light emitted by said display unit;

a touch detection sensor for detecting user touch on said control switches; and display control means for controlling said display unit to: (1) emit only display light corresponding to images representing a specified one of said control switches and related control switches associated with said specified control switch when said touch detection sensor detects user touch on said specified control switch, (2) highlight the image representing said specified control switch in contrast to the images representing said related control switches using a highlight pattern when said touch detection sensor detects the user touch on said specified control switch, and (3) further highlight the image representing said specified control switch in contrast to the images representing said related control switches using a second highlight pattern when said specified control switch is actuated by the user after the user touch.

2. A head-up display device according to claim 1, wherein:

said highlight pattern includes any one of enlarging the image representing said specified control switch in contrast to the images representing said related control switches, reversing shade of the image representing said specified control switch such that the shade of the image representing said specified control switch is contrasted to the images representing said related control switches, or changing color of the image representing said specified control switch such that the color of the image representing said specified control switch is contrasted to the images representing said related control switches.

3. A head-up display device according to claim 1, wherein:

said second highlight pattern includes any one of enlarging the image representing said specified control switch in contrast to the images representing said related control switches, reversing shade of the image representing said specified control switch such that the shade of the image representing said specified control switch is contrasted to the images representing said related control switches, or changing color of the image representing said specified control switch such that the color of the image representing said specified control switch is contrasted to the images representing said related control switches.

4. A head-up display device according to claim 1, wherein:

said touch detection sensor includes touch sensors provided on said control switches.

5. A head-up display device according to claim 4, wherein:

said control switches include air conditioner control switches.

6. A head-up display device according to claim 1, wherein:

said display unit emits display light corresponding to images which represent vehicle speed until said touch detection sensor detects the user touch.

7. A head-up display device according to claim 1, wherein:

said display unit emits said display light corresponding to the images representing said specified control switch and said related control switches for a predetermined period of time after said touch detection sensor detects the user touch.

8. A head-up display device according to claim 7, wherein:

said control switches include air conditioner control switches.

9. A head-up display device for creating a display image in front of a vehicle's windshield by reflecting an image at an inner side of the windshield, said head-up display device comprising:

a display unit for emitting display light corresponding to images representing control switches installed in a vehicle;

an optical reflector for reflecting said display light emitted by said display unit;

a touch detection sensor for detecting user touch on said control switches; and display control means for controlling said display unit to: (1) emit only display light corresponding to images representing a specified one of said control switches and related control switches associated with said specified control switch and (2) highlight the image representing said specified control switch by enlarging the image representing said specified control switch in contrast to the images representing said related control switches when said touch detection sensor detects the user touch on said specified control switch.

10. A head-up display device according to claim 9, wherein:

said display control means further highlights the image representing said specified control switch using a second highlight pattern when said specified control switch is actuated after the user touch.

11. A head-up display device according to claim 10, wherein:

said touch detection sensor includes touch sensors provided on said control switches.

12. A head-up display device according to claim 11, wherein:

said display unit emits said display light corresponding to the images representing said specified control switch and said related control switches for a predetermined period of time after said touch detection sensor detects the user touch.

13. A head-up display device according to claim 12, wherein:

said control switches include air conditioner control switches.

14. A head-up display device for creating a display image in front of a glass medium of a movable body by reflecting an image at the glass medium, said head-up display device comprising:

a display unit for emitting display light corresponding to images representing information relating to said movable body;

an optical reflector for reflecting said display light emitted by said display unit;

detection sensors for detecting changes in said information; and display control means for controlling said display unit to: (1) emit only display light corresponding to images representing specified information relating to said movable body and associated information related to said specified information, (2) highlight the image representing said specified information in contrast to the images representing said associated information using a highlight pattern when said detection sensors detect an instruction to change said specified information, and (3) further highlight the image representing said specified information in contrast to the images representing said associated information using a second highlight pattern when said specified information is changed.

* * * * *